United States Patent [19]
Kight et al.

[11] Patent Number: 5,383,113
[45] Date of Patent: Jan. 17, 1995

[54] SYSTEM AND METHOD FOR ELECTRONICALLY PROVIDING CUSTOMER SERVICES INCLUDING PAYMENT OF BILLS, FINANCIAL ANALYSIS AND LOANS

[75] Inventors: Peter J. Kight; Mark A. Johnson, both of Dublin; Tamara K. Christenson, Gahanna; Regina Lach, Galena; Philip Pointer, Columbus; Kenneth Cook, Gahanna, all of Ohio

[73] Assignee: Checkfree Corporation, Columbus, Ohio

[21] Appl. No.: 736,071

[22] Filed: Jul. 25, 1991

[51] Int. Cl.⁶ .................................... G06F 15/21
[52] U.S. Cl. ................................ 364/401; 364/406; 364/408
[58] Field of Search ................ 364/401, 406, 403; 235/375, 380

[56] References Cited

U.S. PATENT DOCUMENTS

| | | | |
|---|---|---|---|
| 4,484,328 | 11/1984 | Schlafly. | |
| 4,649,563 | 3/1987 | Riskin | 379/97 |
| 4,734,858 | 3/1988 | Schlafly | 364/408 |
| 4,799,156 | 1/1989 | Shavit et al. | 364/408 |
| 4,947,028 | 8/1990 | Gorog | 235/381 |

OTHER PUBLICATIONS

"Mite Mike Bus. Sys.: Order-Entry Billing", Product Literature Abst. from Microsearch file of Orbit, AN:-87-039522.

"Home Banking: A case study", Robert B. Wilumstad pp. 41–55, Banker's Magazine Nov.–Dec. 1984.

Malnig, Anita, "Roundup of Financial Software: Home Accountant", II Computing, vol. 1 No. 3 p. 7413; 2186 Abs. from Microsearch AN:86-031926.

Rae, Sharon Gamble, "Electronic Checkbook", MacIntosh Buyer's Guide, p. 128/1 May 1985, Abstract from Microsearch AN:85-028312.

Hines, Tracie Forman, "The check is in the modem: Excel", MacUser vol. 1, No. 1 p. 6815; 10185 1985 Abstract from Microsearch AN:85-028676.

*Primary Examiner*—Robert A. Weinhardt
*Attorney, Agent, or Firm*—Porter, Wright, Morris & Arthur

[57] ABSTRACT

A computerized payment system by which a consumer may instruct a service provider by telephone, computer terminal, or other telecommunications; means to pay various bills without the consumer having to write a check for each bill. The system operates without restriction as to where the consumer banks and what bills are to be paid. The service provider collects consumers' information, financial institutions' information and merchant information and arranges payment to the merchants according to the consumers' instructions based on a financial risk analysis.

3 Claims, 5 Drawing Sheets

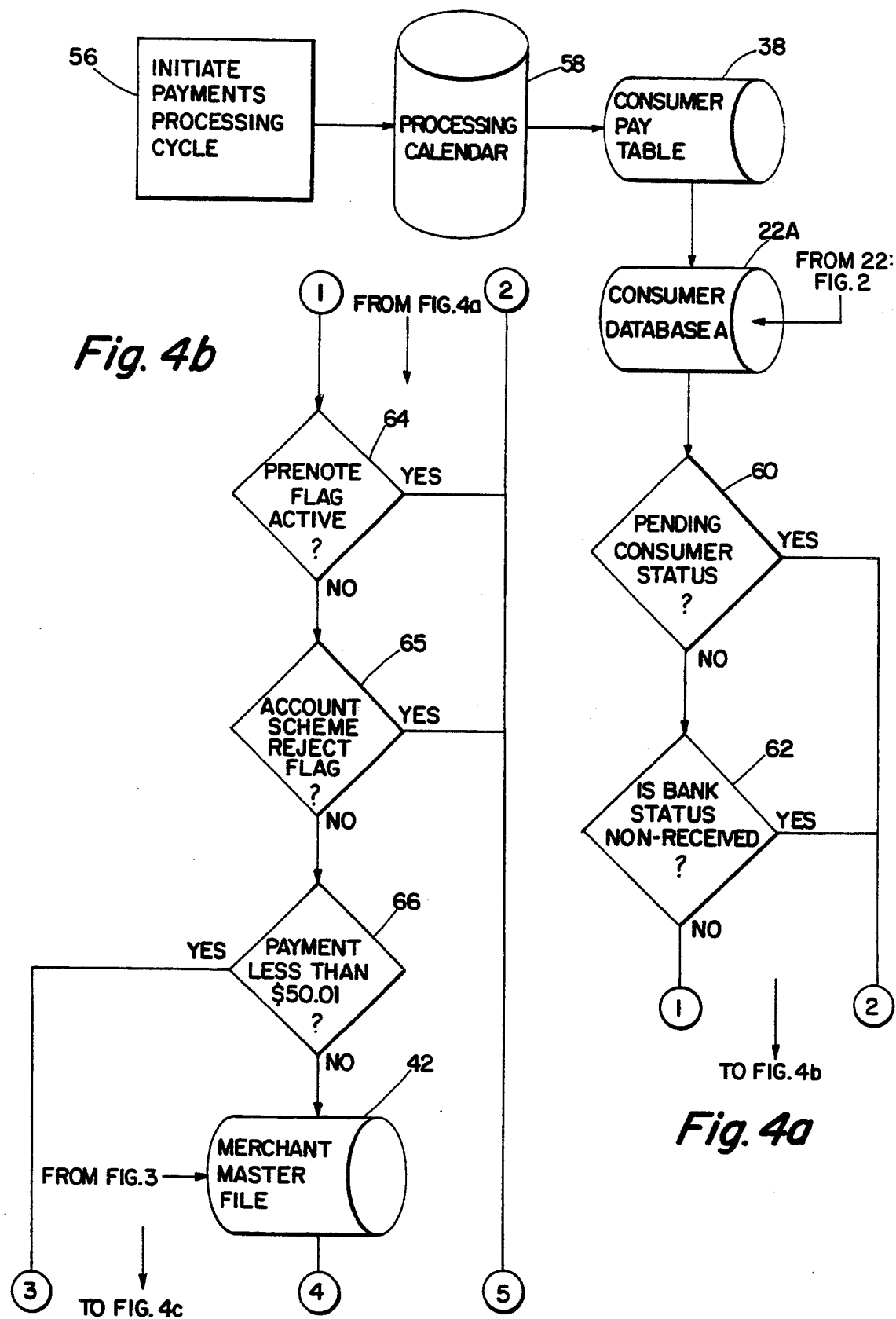

SYSTEM AND METHOD FOR ELECTRONICALLY PROVIDING CUSTOMER SERVICES INCLUDING PAYMENT OF BILLS, FINANCIAL ANALYSIS AND LOANS

BACKGROUND AND SUMMARY OF THE INVENTION

The present invention relates generally to a payment system for and method of paying bills. More particularly, the present invention is a computerized system for paying bills or making other payments whereby a consumer may contact a single source from a remote location via a telephone, a computer terminal with modem, or other electronic means, to direct the single source to pay the consumer's bills instead of the consumer writing checks for each bill. An appendix is submitted with this specification which contains the program code of the present invention.

It has been common for many years for consumers to pay bills by way of a personal check written by the consumer and sent by mail to the entity from which the bill or invoice was received. Consumers have used other ways to pay bills, including personally visiting the billing entity to make a cash payment. In today's economy, it is not unusual for a consumer to have several regular monthly invoices to pay. Writing individual checks to pay each invoice can be time-consuming and costly due to postage and other related expense.

A need exists for a method whereby a consumer can contact a single source and inform the source to pay various bills of the consumer, to have the source adjust the consumer's account with the consumer's financial institution (i.e., bank, credit union, savings and loan association, etc.) to reflect a bill payment, and to actually pay the billing entity a specified amount by a particular time. The system should be efficient and not unreasonably expensive and relatively simple for a consumer to interact with. Some banks have attempted to provide a service for making payment to a few billing entities to which the banks have established relations. The banks that do provide that type of service are limited in that they provide the service only for their own customers since the banks have not developed a system for accurately acquiring and processing account numbers and balances of customers of all other banking institutions and coordinating that information with bill payment. Furthermore, banks have not developed a system for managing the risks involved in providing such a service and the inherent complexities of providing the service to consumers other than the bank's own customers. Therefore, a need exists for a single source bill payment system that would be available to any consumer, regardless of where the consumer banks and regardless of what bills are to be paid.

The present invention is designed to fulfill the above listed needs. The invention provides a universal bill payment system that works regardless of the consumer's financial institution and the bill to be paid. The present invention provides a computerized system by which a consumer may pay bills utilizing the telephone, a computer terminal, or other electronic data transmission means. Transactions are recorded against the consumer's account wherever he or she banks. The consumer may be an individual or a business, large or small.

The method of the present invention includes: gathering consumer information and creating a master file with banking information and routing codes; the generation of payment instructions by the consumer at a convenient location, typically remote from the payment service provider (e.g., at home), through an input terminal such as a personal computer, a push-button telephone or other like communication means; applying the payment instructions to the consumer's file; using computer software of the present invention to examine various files to determine the appropriate form of payment based on variables involving banking institutions and merchants; validating each transaction against a dynamic credit file and routing based on set parameters; and, if after processing no flags are encountered, adjusting the consumer's account (usually by debiting) and making payment directly to the payee in accordance with the consumer instructions.

The single source service provider for consumer bill payment may be any entity with the capability to practice the invention as described hereinafter. The foregoing and other objects and advantages will become more apparent when viewed in light of the accompanying drawings and following detailed description.

BRIEF DESCRIPTION OF THE DRAWINGS

FIG. 5 depicts a payment draft specially adopted for use with the invention.

DESCRIPTION OF PREFERRED EMBODIMENT(S)

Figure 2:
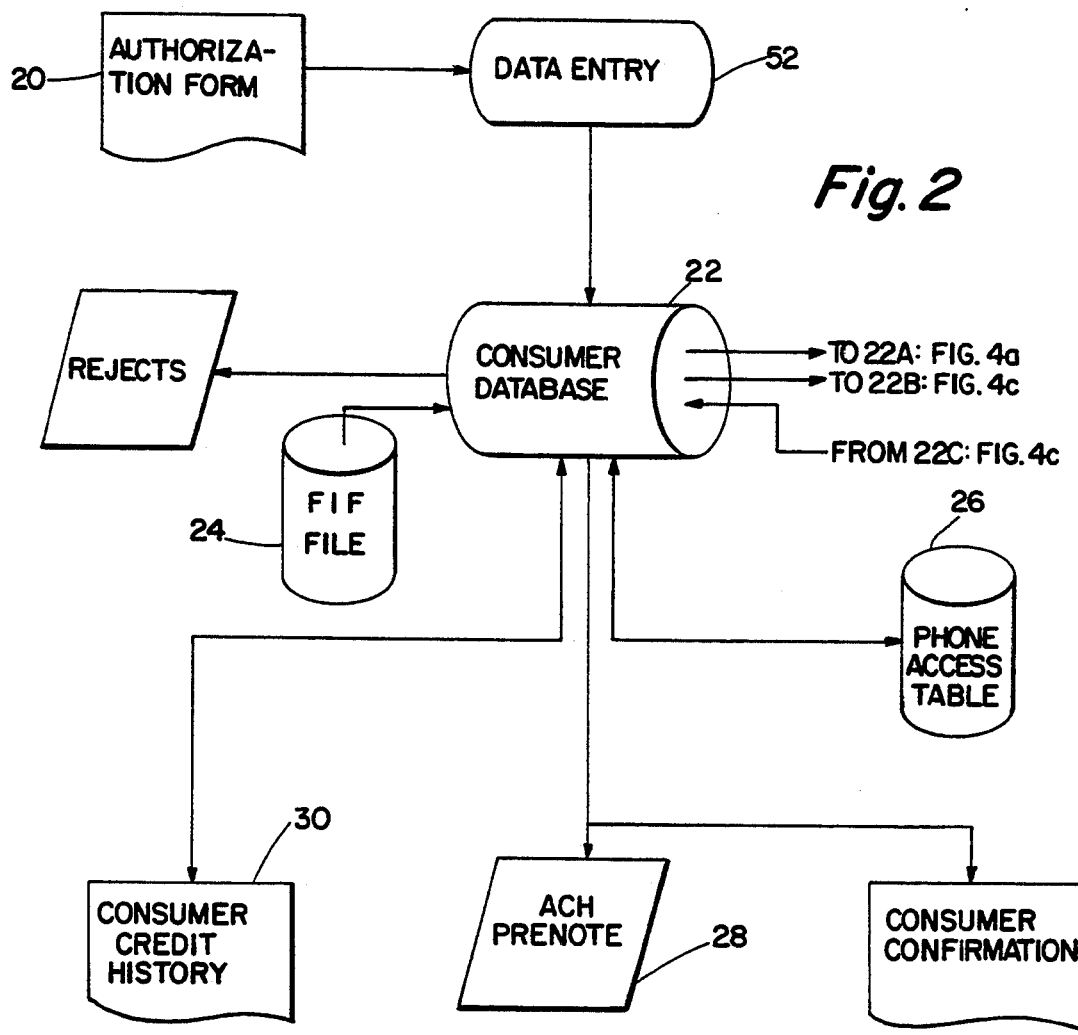
FIG. 2 is a diagramatical representation of the establishment of a consumer database.

Referring now to the drawings, FIG. 2 illustrates the steps in the creation of a consumer database for use with the present invention. The first step in the process is to establish a consumer's data records on the system. This may be accomplished by the consumer completing an authorization form 20 which would contain the needed information to be put into the system concerning the consumer. This information may include the consumer's name, address, telephone number and other applicable information. The consumer would also provide a voided check from the consumer's personal checking account. The consumer's information may then be input via a keyboard 52 or other input means such as a scanner into the consumer database record 22. Default amounts may be set for an individual credit line parameter and for a total month-to-date parameter. These amounts establish the maximum unqualified credit risk exposure the service provider is willing to accept for an individual transaction and for the collective month-to-date transactions of a consumer. As explained hereinafter, the service provider may be at risk when paying a consumer's bill by a check written on the service provider's account. In short, the service provider takes a risk whenever paying consumer's bills on the service provider's account since there is a slight chance the consumer may not reimburse the service provider after the provider has already made payment.

From the voided check, the consumer's bank routing transit and individual account numbers at an institution are input into the computer system. This information may be edited against an internal financial institutions file (FIF) database 24 of the present invention. FIF 24 is a database of financial institutions' identification codes and financial institution account information for the consumer. This file also edits the accuracy of the financial institution's routing transit number and the bank account number supplied by the consumer. If the numbers do not correspond with the correct routing and bank numbers, they are rejected and the data entry is corrected and repeated. FIF 24 in conjunction with the software of the present invention also updates the consumer database 22 for both electronic and paper draft routing and account information. The needed information may be obtained from each banking institution and each consumer.

The consumer is notified by the service provider of his or her local phone number access and personal security code for informing the service provider that a bill is to be paid. This information may be stored in a phone access table 26. The personal security code may be much like an ATM machine four digit code. In addition, an electronic pre-note 28 will be created to be sent to the consumer's bank to inform the bank that the service provider is authorized to debit the consumer's account. For further security to the service provider, a consumer credit record 30 may be obtained. The default credit limit amount over which the service provider may be unwilling to assume financial risk may be modified based on the information obtained from the credit report 30.

Figure 3:
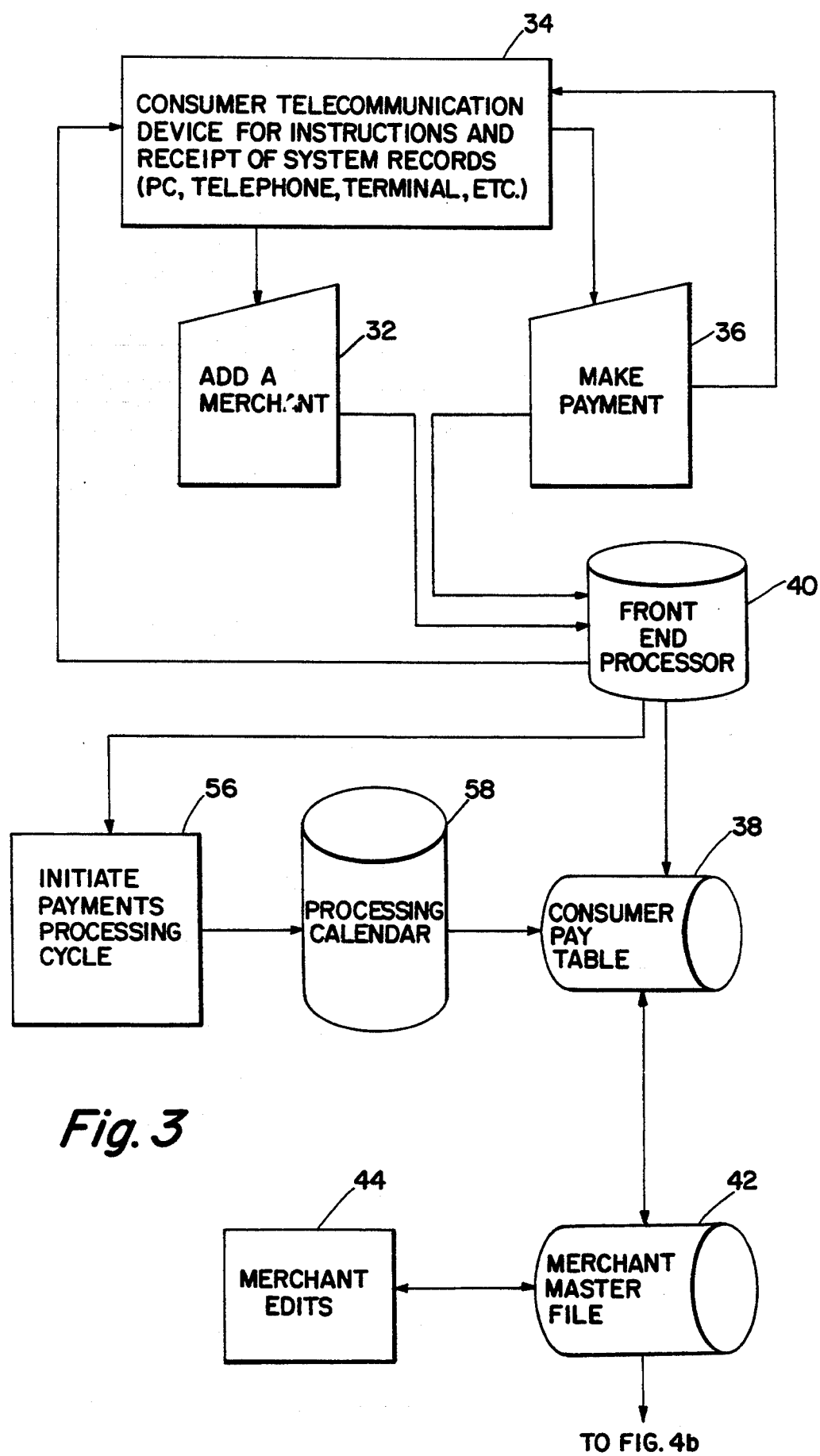
FIG. 3 is a diagramatical representation of the creation of a merchant/payee database.

In FIG. 3 the steps are shown for establishing merchants to be paid and the service provider making a payment. The consumer must inform the service provider or processor of a merchant's name, address, phone number and the consumer's account number with the merchant 32. This information is put into a merchant master file database 42 (MMF). MMF 42 also includes settlement information on each merchant to indicate the form of payment the merchant will accept. MMF 42 also acts as an editor ensuring proper payment format. The term "merchant" as used herein is intended to pertain to any person or entity that the consumer wishes to pay and is not to be limited to the usual men, chants most consumers pay, such as department stores, the electric company, a home mortgage lender, etc. The consumer may also indicate whether the merchant is a variable or fixed merchant. A variable merchant is one in which the date and amount of payment will vary each month. A fixed merchant is one in which the date and amount remain the same each month. If the merchant is fixed, the frequency of payment may be other than monthly, such as weekly, quarterly, etc. The consumer should inform the service provider of the date on which the merchant is to be paid and the amount to be paid.

Through a telecommunications terminal 34 (e.g., a push-button telephone or computer terminal), a consumer may initiate payment of bills. Through the terminal, the consumer may access his merchant list and input the payment date and amount. The system may be provided with a payment date editor 36 to insure that the date is valid and logical (i.e., payment dates already in the past or possibly a year or more into the future, would be questioned). On a personal computer as payments are initiated, a consumer "checkbook register" may be created and automatically updated to reflect this activity. The merchant list may be visible on the consumer's personal computer screen. A consumer may enter merchant payment amounts and pavement dates on the computer screen then transmit this information to the service provider.

By telephone, the list may be presented by programmed voice. The voice may be programmed to ask the consumer if a particular merchant (selected from the consumer's MMF, which may be updated from time to time) is to be paid and to tell the consumer to press 1 if yes, or press 2 if no. If yes, the voice may instruct the consumer to enter the amount to be paid by pressing the numbers on a touch tone phone in accordance with a predetermined code. For example, the digits 0–9 may represent corresponding numerical digits in the amount of dollars to be paid. The asterisk button could be used as a decimal point or represent an entry of cents. Once the amount is entered, the voice may ask the consumer to enter the date on which payment is to be made to the merchant. This may be accomplished by assigning each month a number, such as January being month 01; February being month 02; etc. The consumer may then enter month, day and year for payment. For example, Jul. 9, 1991 may be entered as 070991. The programmed voice may be accomplished with a VRU (voice response unit) available from AT&T or other vendors. It may communicate with a data processor to obtain consumer information from the individual consumer's database file. At the end of the consumer's session on the terminal a confirmation number may be sent to the consumer, providing a record of the transaction.

In FIG. 2 the steps are shown for the creation of the consumer pay table 38 and making updates to it. The consumer's files may be received at the service provider on a front end processor 40 that interfaces with the telecommunications network. The consumer's records may be edited 44 for validity by comparing to the merchants' account scheme. Any new merchant records and account numbers are added to the consumer's pay table 38. New merchants are compared to the MMF 42 and appropriately cross-referenced by the software of the present invention to the pay table to check if a merchant record already exists. If no merchant record exists, a merchant record will be created on the MMF 42.

Payment records may also be received on the service provider's processor. The payment may first go through a validation process against the pay table 38. The validation process checks for duplicate pavements and if duplicates are found they are sent to a reject file. The validation process also verifies that merchants are set up and may check for multiple payments to be paid to a particular merchant. Orders for payment go to the consumer pay table 38 to determine when the payment should be released and how it will be released for payment.

The service provider may pay merchants by a draft or check (paper) or by electronic funds transfer. To create a draft that will pass through the banking system, it must be specially inked. This may be accomplished by a Troy printer which puts a micr code on drafts, comparable to the manner in which the code is included on standard personal checks.

Figure 1:
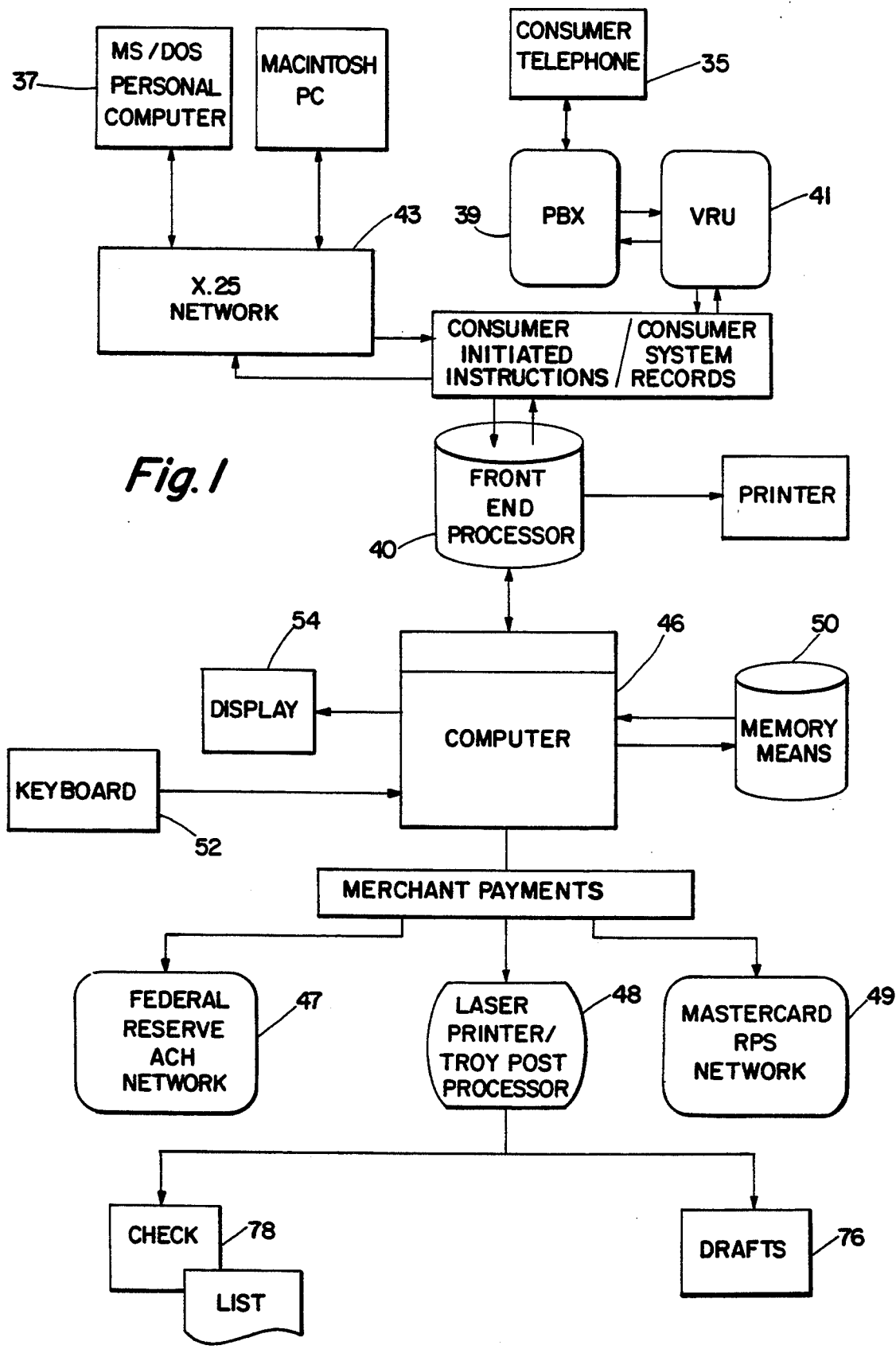
FIG. 1 is a system overview.

In FIG. 1, the front end processor 40 may be a DEC VAX which is connected to an IBM main frame 46 Model 4381. Consumers may call by telephone 35, a number that passes through the private branch exchange 39 and contacts a voice response unit 41 in association with the front end processor 40. After the consumer's payment instructions are received an analysis is performed by the software to determine the most cost effective and least risk mode of payment for the service provider to use. One preferred mode of payment is electronic funds transfer through the Federal Reserve Automated Clearing House (ACH) Network 47. If the service provider is not a bank, a bank intermediary may be needed, to be connected to the Federal Reserve Network. Another payment mode is a charge to the consumer's credit card through the RPS Network 49. Additionally, an IBM Laser Printer attached to a micr post processor 48 may be used by the service provider to send drafts 76 or consolidated checks 78 (checks made payable to a single merchant to cover payments for a number of consumers who all owe the same merchant) to merchants. The main frame 46 has data storage means 50 and runs the FIF 24 and MMF 42 programs. It may also have a tape drive or telecommunication interface for accomplishing electronic funds transfer. It should be recognized that various other hardware arrangements could be used to accomplish the present invention. Alternatively, when the consumer uses a personal computer 37 to instruct the service provider, the personal computer may access the front end processor 40 through the standard X.25 Network 43.

Figure 4C:
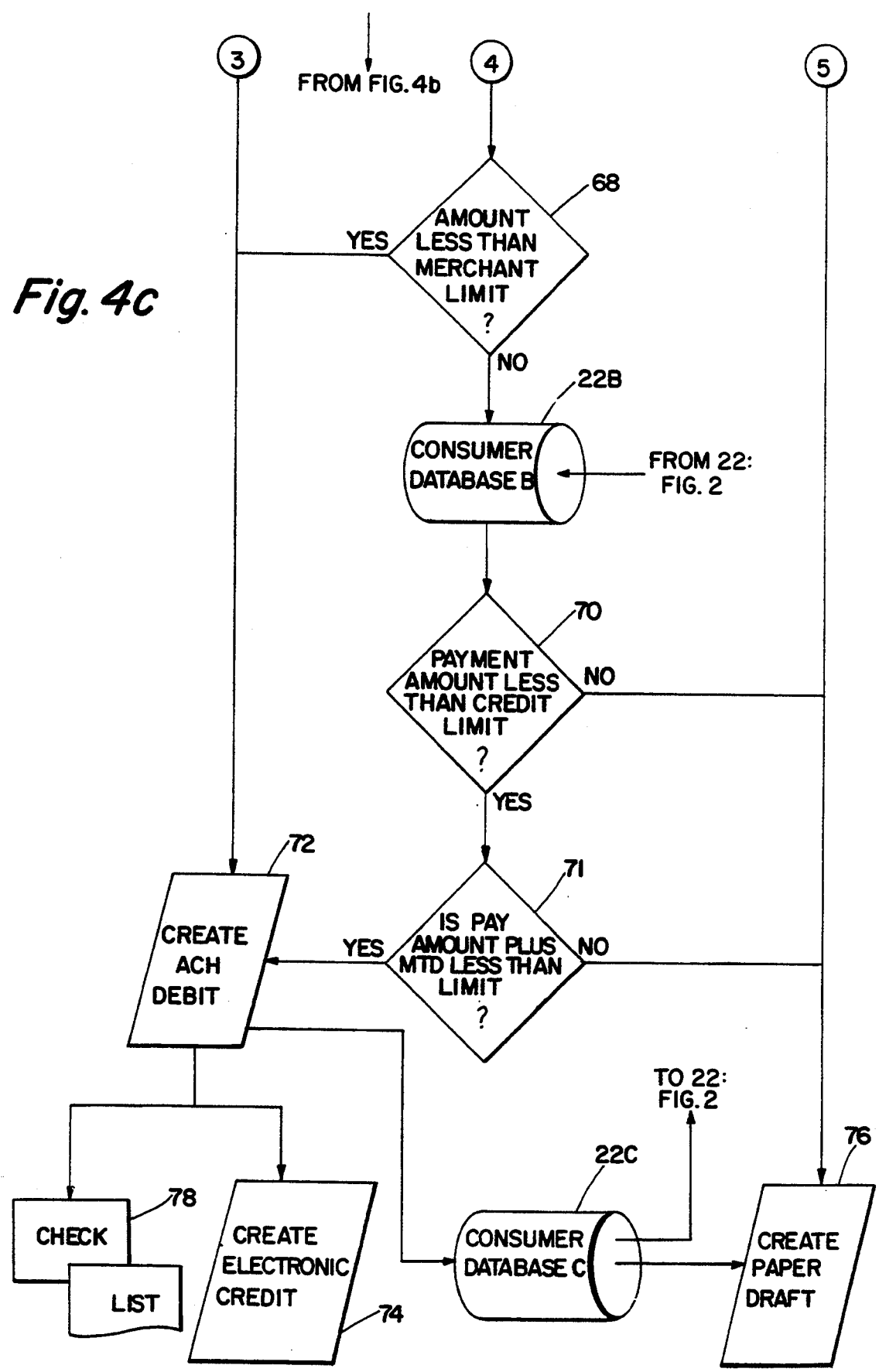
FIGS. 4a and its continuation 4B and 4C are flow chart representations of a payment processing cycle.

Referring now to FIGS. 4a, 4b and 4c, the payment process is shown. The payment process cycle 56 may be initiated each day, or more or less frequently. The first step is to establish when payment items are to be processed. This may be accomplished through a processing calendar 58. A processing calendar means 58 such as a clock may be built into the system. The calendar 58 enables the system to consider each date, including weekends and the Federal Reserve holidays. Payments are released from the consumer pay table 38 using the due date input by the consumer and maintained in the consumer database. Any bank date, payments, or payments within a period such as four business days may be released the same day. All future payment dates would be stored in the consumer pay table 38. On-line inquiry may be made on the consumer pay table 38. The service provider has on-line capability to make changes to the consumer payment upon request until the day the payment is released. A consumer's merchant change may also affect the consumer's payment on the Day table 38.

The method of payment to the merchant may be either paper (draft or check) or electstonic. Assigned factors determine if a payment will be released as a paper item, or an ACH electronic transaction service provider is a party to transaction). Each consumer may be assigned a status such as: active=good; inactive=-bad; and, pending=uncertain, risky. If a consumer's status is pending 60 when the payment processing cycle is initiated by the processing calendar 58, the payment should go out as a draft paper to protect the service provider. When payment is made by draft, the service provider is not a contractual party to the transaction. The consumer's bank account codes are actually encoded onto the draft (as shown in FIG. 5) prepared by the service provider, much like the consumer's personal check. The draft has been specially designed for this process. The draft is payable to either the service provider or the particular merchant. This allows the draft to be delivered to the merchant for payment and depositing, but allows the draft to be legally payable by the bank, with proper authorization. Additionally, posting information for the merchant is contained on the body of the draft. To the applicant's knowledge, it is the first time a draft has been used in such a manner and with this unique design to accomplish this. If the consumer's bank transit number does not indicate an electronic bank 62 (i.e. a banking institution that will accept electronic funds transfer), the program associated with FIF 24 sends the payment as a draft. A pre-note 28 is required any time 64 new banking information is entered on a consumer and the bank shows on FIF 24 as an electronic receiving bank. The present pre-note period under federal Law is ten (10) days. Any payments released during this period are sent as paper.

The third manner in which the service provider may pay bills is by a check written on the service provider's account. A consolidated check may be written if many consumers have asked the service provider to pay the same merchant. Under this method of payment the service provider assumes some risk since the service provider writes the check on its own account. The service provider is later reimbursed by the (consumer's) banking institution(s).

As a means of minimizing risk to the service provider, any transaction may be compared to the MMF 42 credit limit. For example, if the credit limit is greater than zero and the payment is $50.00 or less 66, the item may be released as an electronic payment 74 or by service provider check 78. If the payment is greater than $50.00 but less than or equal to the merchant credit limit 68, the payment may be released as an electronic payment 74 or check 78. Any payments within the merchant's credit limit 70 are added to the consumer's monthly ACH balance 72. This provides a monthly total billing day to billing day summary of the consumer's electronic payment activity. Any transaction may be compared to the consumer's database credit limit parameters. If a payment amount is greater than the consumer's credit limit, the item is released as a draft 76 which is written on the consumer's account. If the payment amount plus the total of electronic payments in a particular month is greater than the consumer's credit limit, the item is released as a draft 76. Items not released as paper are initiated as an ACH debit against the consumer's account.

The consumer database may be reviewed for proper electronic funds transfer (EFT) routing. Payment to the merchant may be accomplished one of three ways, depending on the merchant's settlement code. Various merchant's settlement codes may be established. For example, a merchant set up with a settlement code "01" results in a check and remittance list 78 being mailed to the merchant. Merchants with a settlement code such as "10" produce an ACH customer initiated entry (CIE). Merchants with a settlement code such as "13" produce a remittance processing system (RPS) credit.

In the consumer pay table, for fixed payments, a payment date gets rolled to the next scheduled payment date on the pay table. The number of remaining payments counter is decreased by one for each fixed payment made. For variable payments, once made the payment date is deleted from the consumer pay table. The schedule date and amount on the consumer pay table roll to zero. A consumer payment history may also be provided which show items such as princess date as well as collection date, settlement method, and check number in addition to merchant name and amount.

The software of the present invention makes several decisions related to particular transactions for consumers as shown in FIGS. 4A, B, C. The following example is provided to more fully describe the software. This example is not intended to limit the application to the details described in the example and is only provided to further enhance the description of the invention already stated above.

For this example, assume that a consumer has five transactions of varying amounts to different merchants for which the consumer has asked the service provider to arrange payment. For simplicity, assume that the five payments are to be made on the same day. First, the consumer database 22 is edited to validate the status, banking institution, and pre-note flags associated with the consumer's requested payments. The account numbers provided by the consumer for the merchants to be paid are also checked to determine if they are valid. Assuming the merchant account numbers are valid, the program begins with the first dollar analysis.

For purposes of this example, the five payments the consumer has requested are in the amounts of: $25.00; $75.00; $150.00; $250.00; and $1000.00. The program will consider each dollar amount individually as it goes through the various edit modes. The first edit may be called a $50.01 edit. In this example, any transaction that is less than $50.01 is automatically sent as an ACH debit to the consumer's account. This means that the service provider uses ACH to electronically transfer funds from the consumer's account to the service provider's clearing account.

In this example, the initial payment of $25.00 falls within the $50.01 edit and will be said without any further edits being conducted for this particular payment. Continuing with the example, the next edit may be a merchant dollar edit that is established for the specific merchant to which the transaction is being sent. For purposes of this example, this edit is set at $100.00 for all merchants. Different dollar edits can be incorporated for different merchants. In the example, the second payment request of the consumer, for $75.00, meets the $100.00 merchant edit parameter and is sent as an ACH debit to the consumer's account. Note that the $75.00 payment would not have satisfied the $50.01 edit and therefore would have passed on to the second edit which in this case is the merchant dollar edit.

The remaining three payments in the example exceed both the $50.01 edit and the merchant $100.00 edit and therefore, go to the next edit. In the example, the next edit is for a consumer individual transaction limit set at $200.00. The $150.00 payment is less than the $200.00 consumer individual transaction limit and is, therefore, sent as an ACH debit to the consumer's account and paid. The other two remaining payments yet to be made exceed the $200.00 limit in this example and pass to the next edit.

In the next edit, which happens to be the last edit in the example, the consumer's month-to-date "unqualified" risk limit is checked. In the example, the month-to-date limit is set at $1,500. Assume that for this particular consumer $400.00 of month-to-date payments have already been made on the consumer's behalf. Added to the $400.00 would be the three payments made above for $25.00, $75.00 and $150.00. So an additional $250.00 is added to the $400.00 month-to-date for a total of $650.00 "unqualified" risk for the current month-to-date amount. The next payment to be made is for $250.00 and would fall within the $1,500 month-to-date limit when added to the current $650.00 risk amount. Therefore, the $250.00 payment is made and an ACH debit is sent to the consumer's account. This brings the total month-to-date "unqualified" risk amount to $900.00. The final $1,000 payment has not been paid and would send the "unqualified" risk amount over $1,500 when added to the $900.00. Since the final payment of $1,000 in the example, fails the consumer month-to-date limit edit, the $1,000 payment would be sent as a paper draft directly drawn on the consumer's account, and for which the service provider has no liability. In the example, the final step would be updating the consumer month-to-date current total to $900.00.

The apparatus for and method of bill payment of the present invention and many of its attendant advantages will be understood from the foregoing description. It will be apparent that various changes may be made in the form and steps thereof without departing from the spirit and scope of the invention or sacrificing all of its advantages.

What is claimed is:

1. A system for use by a service provider to pay bills rendered to a consumer by billing entities, said system comprising:
    a financial institutions database having specific information pertaining to the consumers' financial institutions at which consumers maintain accounts and from which accounts payments to the billing entities may be made;
    a billing entities database having specific information pertaining to the billing entities to be paid;
    at least one remote telecommunications device operable by a consumer to be in communication with a central processing unit operated by said service provider;
    a program directing the operations of said central processing unit to analyze instructions received from said consumer through said telecommunications device, said program further including means for identifying a preferred form of payment drawn on the consumer's account at the financial institution with respect to payments to be effected to said billing entities; and
    means for effecting payment of the bills on behalf of the consumer's accounts, to said billing entities, said payments to be made from the consumer's account at the financial institution, whether or not the service provider is a bank.

2. The system of claim 1 wherein the preferred form of payment is selected from a member of the group consisting of electronic funds transfer, charge to a credit card, a check, and a draft.

3. The system of claim 1 wherein said program further includes means for relating certain dollar amount limits to preselected forms of payment to determine the form of payment to be effected to said billing entities.

* * * * *